United States Patent
Zhou

(10) Patent No.: US 7,185,037 B2
(45) Date of Patent: Feb. 27, 2007

(54) VIDEO BLOCK TRANSFORM

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 540 days.

(21) Appl. No.: 10/225,749

(22) Filed: Aug. 22, 2002

(65) Prior Publication Data

US 2003/0093452 A1 May 15, 2003

Related U.S. Application Data

(60) Provisional application No. 60/371,763, filed on Apr. 10, 2002, provisional application No. 60/322,531, filed on Sep. 10, 2001, provisional application No. 60/317,169, filed on Sep. 5, 2001, provisional application No. 60/314,348, filed on Aug. 23, 2001.

(51) Int. Cl.
*G06F 17/14* (2006.01)
*H04N 7/12* (2006.01)

(52) U.S. Cl. .................................. 708/400; 375/240.03
(58) Field of Classification Search ................ 708/400, 708/401, 402
See application file for complete search history.

(56) References Cited

U.S. PATENT DOCUMENTS 6,859,558 B2 * 2/2005 Hong .......................... 382/236
6,882,685 B2 * 4/2005 Malvar .................. 375/240.03
2003/0206585 A1 * 11/2003 Kerofsky ............... 375/240.03

* cited by examiner

*Primary Examiner*—Chuong D. Ngo
(74) *Attorney, Agent, or Firm*—Carlton H. Hoel; W. James Brady; Frederick J. Telecky, Jr.

(57) ABSTRACT

Integer transforms of 4×4 blocks of the type used in proposed H.26L but adapted to 16-bit arithmetic by shifts after matrix multiplications and integer approximation matrices absorbing scaling factors.

3 Claims, 1 Drawing Sheet

VIDEO BLOCK TRANSFORM

CROSS-REFERENCE TO RELATED APPLICATIONS

This application claims priority from provisional patent application Nos. 60/314,348, filed Aug. 23, 2001; 60/317,169, filed Sep. 5, 2001; 60/322,531, filed Sep. 10, 2001; and 60/371,763, filed Apr. 10, 2002.

BACKGROUND OF THE INVENTION

The present invention relates to video compression and decompression, and more particularly to transform methods such as DCT in block compression and decompression.

H.26L is a new video compression video standard being developed by ITU-T. It offers much higher coding efficiency which provides about 30–50% additional bit-rate reduction at the same coding qualities as compared to the MPEG-4 SP. A typical application of H.26L could be wireless video on demand, in which the bandwidth is so limited that a coding standard of high compression ratio is strongly desired.

As illustrated in FIG. 2, the basic coding techniques in H.26L are still the motion compensated prediction, transform, quantization and entropy coding. However, it differs from MPEG4/H.263 in great detail. One of major differences lies in the transform and quantization. Instead of 8×8 DCT transforms, H.26L uses a 4×4 integer transforms for the residual coding (residual blocks are generated by using the motion compensation for inter-coded macroblocks, and using the intra prediction for intra-coded macroblocks). Both the transform and quantization are designed for 32-arithmetic.

However, in the typical H.26L application, such as wireless video on demand, the hand-held devices are normally powered by 16-bit chipsets that are low-cost and have low power consumption. It is very expensive to implement 32-bit based transforms and quantization on 16-bit devices. Therefore, it is of interests to H.26L adoption that a 16-bit based transform and quantization is supported.

SUMMARY OF THE INVENTION

The present invention provides block transforms by left and right matrix multiplications with normalizing shifts between matrix operations to maintain a bit precision in the elements.

BRIEF DESCRIPTION OF THE DRAWINGS

The drawings are heuristic for clarity.

DESCRIPTION OF THE PREFERRED EMBODIMENTS

1. Overview

Figure 1:
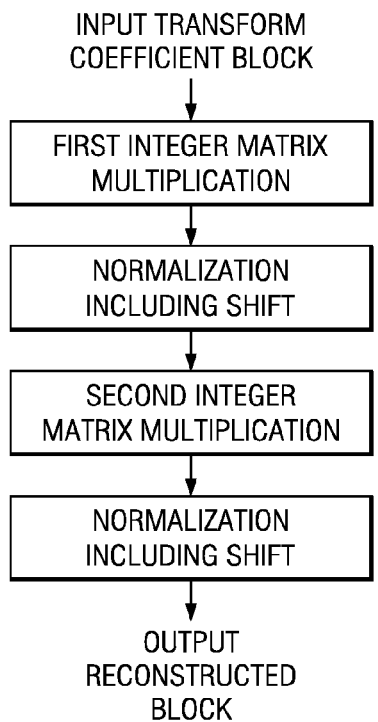
FIG. 1 is a flow diagram of preferred embodiment methods.

Preferred embodiments provide block transforms based on left and right matrix multiplications with a (orthogonal) matrix and its transpose (such as DCT) but use integer-valued elements plus normalizing shifts to allow limited bit precision implementations. Further preferred embodiments have the inverse transform matrix and its transpose differing in number of bits for the elements and possible scaling with round off; see FIG. 1. Preferred embodiments include 16-bit modifications of proposed H.26L video compression-decompression transforms but achieve performance comparable to the 32-bit arithmetic of proposed H.26L.

Figure 2:
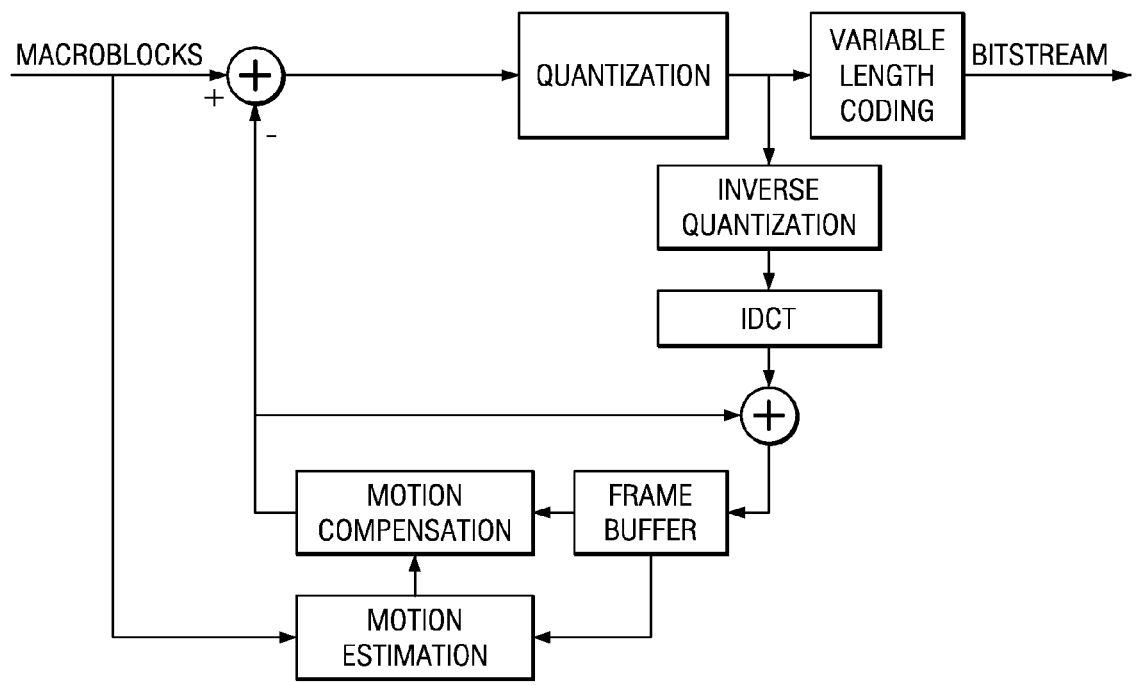
FIG. 2 shows motion compensation generally.

The functions of FIG. 2 using the preferred embodiment methods can be performed with 16-bit digital signal processors (DSPs) or 16-bit general purpose programmable processors or application specific circuitry or systems on a chip such as both a DSP and RISC processor on the same chip with the RISC processor as controller. Consumer devices with wireless video capabilities may include further specialized accelerators for JPEG/MPEG/H.26L encoding and decoding and could be added to a chip with a DSP and a RISC processor. And the data processing functions could be a stored program in an onboard or external ROM, flash EEPROM, or ferroelectric RAM for any programmable processors.

2. 4×4 Approximate-DCT Transform For Residual Blocks

Motion compensated video compression with 4×4 blocks yields motion vectors plus 4×4 blocks of residuals which are transformed, quantized, encoded, and transmitted along with the corresponding encoded motion vectors. Decompression reverses these steps (inverse quantization and inverse transformation to reconstruct residuals to add to motion vector reconstructed block). Thus presuming error-free, lossless transmission, the net overall operations on a 4×4 residual block are transformation, quantization, inverse quantization, and inverse transformation. The following paragraphs consider this in more detail, first for the H.26L standard and then the corresponding preferred embodiments.

a) Forward 4×4 Transform

Let a be a 4×4 block of pixel residuals $a_{i,j}$ for i,j=0,1,2,3 and with each residual an integer in the range [−255, 255]; that is:

$$a = \begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{bmatrix}$$

Also, let U be the 4×4 matrix:

$$U = \begin{bmatrix} 13 & 13 & 13 & 13 \\ 17 & 7 & -7 & -17 \\ 13 & -13 & -13 & 13 \\ 7 & -17 & 17 & -7 \end{bmatrix}$$

Note that U/26 is a real, orthogonal matrix: $UU^T = 676\,I$ (the superscript $T$ denotes transpose), where I is the 4×4 identity matrix. Also, U/26 is an integer approximation to the 4×4 DCT transform matrix.

Then apply U to transform the 4×4 block of residuals a into the 4×4 block of non-normalized approximate DCT coefficients $F = UaU^T$, with elements $F_{i,j}$ for i,j=0,1,2,3. This is the proposed H.26L forward 4×4 transform. Since the forward transform contains no normalization, the coefficients have 21-bit precision; indeed, the minimum $F_{i,j}$ value is −52*52*255.

b) Quantization

Let $F_{i,j}$ be a coefficient defined as in the foregoing, then the quantization of $F_{i,j}$ is denoted $Level_{i,j}$ for i,j=0,1,2,3 and defined as $$Level_{ij} = (F_{ij} \times A(QP) + \text{frac} \times 2^{20})/2^{20}$$

where |frac| is in the range (0–0.5) and frac has the same sign as $F_{ij}$ and provides round-off; A(QP) is the quantization scale defined as for integer QP in the range [0,63] as {620, 553, 492, 439, 391, 348, 310, 276, 246, 219, 195, 174, 155, 138, 123, 110, 98, 87, 78, 69, 62, 55, 49, 44, 39, 35, 31, 27, 24, 22, 19, 17}.

A(QP) is in 10-bit format (maximum value 620), so the quantized 4×4 coefficient block Level has 10-bit precision; in fact, the minimum value is $-408 = (-52*52*255*620 + 2^{19})/2^{20}$.

The 10-bit quantized coefficients $Level_{ij}$ are encoded and transmitted.

c) Inverse Quantization

After decoding the received 10-bit quantized coefficients $Level_{ij}$, apply the inverse quantization defined as:

$$F'_{ij} = Level_{ij} \times B(QP)$$

where $F'_{ij}$ for i,j=0, 1, 2, 3 are the elements of the inverse-quantized coefficient block F'; and the inverse-quantization scale B(QP) is for QP in the range 0 to 63: {3881, 4351, 4890, 5481, 6154, 6914, 7761, 8718, 9781, 10987, 12339, 13828, 15523, 17435, 19561, 21873, 24552, 27656, 30847, 34870, 38807, 43747, 49103, 54683, 61694, 68745, 77615, 89113, 100253, 109366, 126635, 141533}

The relation between quantization and inverse quantization is (rounded off):

$$A(QP) \times B(QP) \times 676^2 = 2^{40}.$$

Here, B(QP) is in 18-bit precision, and so the inverse-quantized coefficient block F' is in 22-bit precision with minimum coefficient value of $-2^{20} \times 52 \times 52 \times 255/676^2$.

d) 4×4 Inverse Transform

Reconstruct the 4×4 block of residuals, denoted a' and with elements $a'_{ij}$ for i,j=0,1,2,3 and with each residual an integer in the range [−255, 255], by the inverse transform on F' and scaling by $2^{20}$ with round off: $a' = U^T F' U // 2^{20}$ where // denotes division with round off. These matrix operations avoid any overflow with 32-bit arithmetic.

The following table summarises the bit precision of each processing step. Obviously, it is very expensive to implement such a transform and quantization method on the 16-bit based devices, because it requires larger than 16-bit data storage 32-bit based multiplications.

| Operation | Input data precison | output data precision | comments |
| --- | --- | --- | --- |
| 4 × 4 forward transform | 9-bit | 21-bit | |
| Quantization | 21-bit and 10-bit | 10-bit | shift of 20 and 19 bit is required |
| Inverse-Quantization | 10-bit and 18-bit | 22-bit | |
| 4 × 4 inverse transform | 22-bit | 9-bit | shift of 20 bit required |

The preferred embodiment approximate integer 4×4 DCT transform rescales and perturbs the foregoing 4×4 transforms and thereby allows for 16-bit arithmetic with minimal degradation. In particular, first preferred embodiments include the following.

a) Forward 4×4 Transform

The preferred embodiment transforms the 4×4 matrix of residuals a into the 4×4 matrix of approximate DCT coefficients f with elements $f_{ij}$ for i,j=0,1,2,3 defined by $f = (32*512/676*676) \ UaU^T = (1024/169^2) \ UaU^T = (1024/169^2)f$. This scaling factor 32*512/676*676 reduces the coefficients to 16-bit precision; the minimum $f_{ij}$ value is $-2*255*2048/2197 = -24,721.42 > -32,768 = -2^{15}$.

And to avoid division in the scaling factor, the preferred embodiment transform may be implemented in two integer matrix multiplications followed by a right shift and round off. In particular, first compute b=Ua. Then compute f=bV followed by a right shift of 15 (division by $2^{15}$) plus round off; V is given by $$V = \begin{bmatrix} 15272 & 19972 & 15272 & 8223 \\ 15272 & 8223 & -15272 & -19972 \\ 15272 & -8223 & -15272 & 19972 \\ 15272 & -19972 & 15272 & -8223 \end{bmatrix}$$

Note that V has all integer elements but equals (8223/7) $U^T$ to within one part in 16,000. That is, the preferred embodiment transform replaces the two matrices U and $U^T$ by U and V where V is an integer approximation of scaled $U^T$ to allow 16-bit precision arithmetic without divisions.

b) Quantization

Let $f_{ij}$ be a coefficients as defined in the 4×4 forward transform above, then define the quantization as $$Level_{ij} = (f_{ij} \times AA(QP) + frac \times 2^{16})/2^{16}$$

again taking |frac| in the range (0–0.5) to indicate round off and of the same sign as $f_{ij}$ The quantization scale AA(QP) is defined for parameter QP in range [0,31] {1081, 964, 858, 765, 682, 607, 540, 481, 429, 382, 340, 303, 270, 241, 214, 192, 171, 152, 136, 120, 108, 96, 85, 77, 68, 61, 54, 47, 42, 38, 33, 30}.

Thus AA(QP) has 11-bit precision with a maximum value of 1081, the quantized 4×4 coefficient block Level has 10-bit precision: indeed, the minimum equals $-408 = (-2*52*255*1081*2048/2197 + 2^{15})/2^{16}$.

Note that the preferred embodiment is mathematically equivalent to the previously described 4×4 forward plus quantization because $$\begin{cases} f_{i,j} = \dfrac{1024}{169*169} F_{i,j} & i, j = 0, 1, 2, 3 \\ AA(QP) = \dfrac{169*169}{16*1024} A(QP) & QP = 0, 1, 2, \ldots, 31 \end{cases}$$

Therefore, the preferred embodiment 4×4 forward transform and quantization has minimal influence on coding efficiency compared to the 32-bit based 4×4 forward transform and quantization.

c) Inverse Quantization

The preferred embodiment inverse quantization is defined as follows:

$f'_{ij} = (Level_{ij} \times BB(QP) + frac \times 8)/16$ again with |frac|=1 and frac of the same sign as $Level_{ij}$ for round off.

That is, $\{f'_{ij}|i,j=0, 1, 2, 3\}$ is the inverse-quantized 4×4 coefficient block, and the inverse-quantization scale BB(QP) is defined for QP in the range [0,31] as {970, 1087, 1222, 1370, 1537, 1727, 1941, 2179, 2444, 2744, 3084, 3460, 3883, 4350, 4899, 5461, 6132, 6898, 7710, 8738, 9709, 10922, 12336, 13617, 15420, 17189, 19418, 22310, 24966, 27594, 31775, 34952}

BB(QP) has 16-bit precision; the relation between AA( ) and BB( ) is:

$$AA(QP) \times BB(QP) = 2^{20}.$$

Hence, the inverse-quantized coefficient block f' is in 16-bit format.

d) Inverse 4×4 Transform

The reconstructed 4×4 residual block a' with elements $a'_{ij}$ for i,j=0,1,2,3 is then computed as $a'=(1/32*512) U^T f'U$ where U is as in the foregoing. To keep the operations in 16-bit precision, implement the 4×4 matrix multiplications in two steps: First compute $b'=U^T f'//2^5$ where again the // denotes division (here, right shift by 5) with round off; this yields 16-bit precision for b'. Then compute $a'=b'U//2^9$ which will be in 9-bit precision; see FIG. 1. Because the scaling was a power of 2, no integer approximation, such as V in the forward 4×4 transform, is required. The following table illustrates the preferred embodiment operations precision and thus memory requirements.

| Operation | Input data precison | output data precision | comments |
|---|---|---|---|
| 4 × 4 forward transform | 9-bit | 16-bit | |
| Quantization | 16-bit and 11-bit | 10-bit | shift of 16 and 15 bit is required |
| Inverse-Quantization | 10-bit and 16-bit | 16-bit | shift of 4 bit is required |
| 4 × 4 inverse transform | 16-bit | 9-bit | shift of 5 and 9 bit is required |

3. 4×4 Luminance DC Blocks

For an intra-coded frame, a 16×16 macroblock (256 color pixels) is first color-space transformed into the selected luminance-chrominance format. For example, in the popular 4:2:0 format a 16×16 macroblock is transformed into a 16×16 block of luminance pixels plus two 8×8 blocks of chrominance pixels where the luminance pixels are at the same locations as the original color pixels but each 8×8 chrominance block has pixels in subsampled locations of the original 16×16 macroblock.

In proposed H.26L a 16×16 luminance block is partitioned into 16 4×4 luminance blocks (denoted $Y_{m,n}$ for m,n=0,1,2,3) and each such 4×4 luminance block is approximately DCT transformed with 4×4 orthogonal integer matrix U as in the foregoing; namely, $UY_{m,n}U^T$. This yields 16 4×4 transformed blocks, with each 4×4 transformed block having a DC component, denoted $D_{m,n}$ for $UY_{m,n}U^T$. Then these 16 DC components can be considered as a 4×4 matrix (the luminance DC block) D with elements $D_{ij}$ for i,j=0,1,2,3 with 21-bit precision; the minimum value is −52×52×255. Then apply the foregoing (4×4 transform, quantization for compression and inverse quantization and inverse 4×4 transform for decompression).

a) 4×4 Forward Transform For Luminance DC

Apply the integer approximation DCT transform matrix U and scale it to yield transformed 4×4 matrix $F_D$ defined by $F_D=(49/2^{15}) U D U^T$ with elements $F_{Dij}$ for i,j=0,1,2,3 with 23-bit precision; the minimum value of −52×52×52×52×25× 49/2$^{15}$.

b) Quantization

Same as in the forgoing with A(QP); this yields 12-bit precision.

c) Inverse Quantization

Same as in the foregoing with B(QP); this yields 24-bit precision: minimum value of −6397438=(−52×52×52×52× 255×49/2$^{15}$)×(2$^{20}$/676$^2$).

d) Inverse 4×4 Transform For Luminance DC

Reconstruct the luminance DC block by $D'=(48/2^{15}) U^T F_D U$ where the output elements have 22-bit precision: minimum value equals −1616735=−52×52×52×52×255× 49×48×13×13/2$^{30}$)×(2$^{20}$/676$^2$). (In the actual H.26L software implementation, the inverse-quantization and inverse-transform are combined, the inverse-transform happens first followed by the inverse-quantization in the spatial domain.)

The following table summarises the bit precision of each processing step for the luminance DC block. Obviously, the implementation of the luminance DC block transform and quantization is expensive because each step needs 32-bit based multiplication.

| Operation | Input data precison | output data precision | comments |
|---|---|---|---|
| 4 × 4 forward transform | 21-bit | 23-bit | shift of 15 bit needed |
| Quantization | 23-bit and 10-bit | 12-bit | shift of 20 and 19 bit is required |
| Inverse-Quantization | 12-bit and 18-bit | 24-bit | |
| 4 × 4 inverse transform | 24-bit | 22-bit | shift of 15 bit required |

The preferred embodiments use the 4×4 luminance DC block arising from the preceding preferred embodiment approximate DCT transform and replaces the 4×4 forward approximate DCT of the luminnance DC blcok with the 4×4 Hadamard transform using the symmetric 4×4 matrix W plus a scaling by ¼:

$$W = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

In particular, because the preferred embodiment approximate forward 4×4 coefficients $f_{ij}$ relate to the proposed H.26L forward 4×4 coefficients $F_{ij}$ by $f_{ij}=(1024/169^2)F_{ij}$ for i,j=0,1,2,3, the preferred embodiment luminance DC coefficients, denoted $d_{ij}$, relate to the foregoing luminance DC coefficients $D_{ij}$ by $d_{ij}=(1024/169^2)D_{ij}$. The preferred embodiments transform d into $f_D$ using W:

a) 4×4 Forward Transform For Luminance DC

Compute $f_D=(¼)W d W$ as the 4×4 forward transform for d. Note that the minimum value after the transform is −98884 (−52×52×255×1024×4/169$^2$), Therefore, the luminance DC transform coefficient block {$f_{Dij}$|i,j=0, 1, 2, 3} has 18-bit precision.

b) Quantization

The preferred embodiment quantization using AA(QP) is applied to the luminance DC coefficient block {$f_{Dij}$|i,j=0,1, 2,3}, which results the quantized luminance DC coefficient block with 14-bit precision.

c) Inverse Quantization

On the decoder side, the preferred embodiment inverse-quantization using BB(QP) is applied to get the inverse-quantized luminance DC coefficient block $\{f'_{Dij}|i,j=0,1,2,3\}$. As it can be obtained from the foregoing, the invere quantization output is in 18-bit.

d) Inverse 4×4 Transform For Luminance DC Block

The inverse-transform is defined by $d'=(\frac{1}{4})W\, f'_D\, W^T$ and thus the inverse-transform output $\{d'_{ij}|i,j=0,1,2,3\}$ has 16-bit precision: the minimum value is $-52\times 52\times 255\times 1024\times 4/169^2/4$.

The following table summarises the bit precision of each processing step for the luminance DC block.

| Operation | Input data precison | output data precision | comments |
|---|---|---|---|
| 4 × 4 forward transform | 16-bit | 18-bit | shift of 2 bit needed |
| Quantization | 18-bit and 11-bit | 14-bit | shift of 16 and 15 bit is required |
| Inverse-Quantization | 14-bit and 16-bit | 18-bit | |
| 4 × 4 inverse transform | 18-bit | 16-bit | shift of 2 bit required |

Note that in the preferred embodiment transforms, there are no 32-bit based multiplication operation, even if 18-bit data is involved. Also, the multiplication in the inverse-quantization is strictly 16-bit based.

4. Non-orthogonal 4×4 Transform in Place of DCT

Instead of an integer approximation for the DCT, proposed H.26L also has an alternative integer transform with a coding gain similar to a 4×4 DCT. In particular, an input 4×4 block X with elements $x_{ij}$ for i,j=0,1,2,3 can be transformed into output 4×4 block Y with elements $y_{ij}$ for i,j=0,1,2,3 by defining $Y=MXM^T$ where M is the following 4×4 matrix:

$$M = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

Note that M is not orthogonal, but $MM^T$ is a diagonal matrix with diagonal elements 4, 10, 4, and 10. More explicitly, the transformation of input pixels to output coefficients is:

$$Y = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} \begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

Multiplication by 2 can be performed either through additions or through left shifts, so that no actual multiplication operations are necessary. Thus, the transform is multiplier-free.

For input pixels with 9-bit dynamic range (because they are residuals from 8-bit pixel data), the transform coefficients are guaranteed to fit within 16 bits, even when the second transform for luminance DC coefficients is used. Thus, all transform operations can be computed in 16-bit arithmetic. In fact, the maximum dynamic range of the transforms coefficients fills a range of only 15.2 bits; this small headroom can be used to support a variety of different quantization strategies (which are outside the scope of this specification).

The inverse transformation of normalized coefficients $Y'=\{y'_{00}, \ldots, y'_{33}\}$ to output pixels X' is defined by:

$$X' = \begin{bmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{bmatrix} \begin{bmatrix} y'_{00} & y'_{01} & y'_{02} & y'_{03} \\ y'_{10} & y'_{11} & y'_{12} & y'_{13} \\ y'_{20} & y'_{21} & y'_{22} & y'_{23} \\ y'_{30} & y'_{31} & y'_{32} & y'_{33} \end{bmatrix} \begin{bmatrix} 1 & 1 & 1 & 1 \\ 1 & \frac{1}{2} & -\frac{1}{2} & -1 \\ 1 & -1 & -1 & 1 \\ \frac{1}{2} & -1 & 1 & -\frac{1}{2} \end{bmatrix}$$

Multiplications by $\frac{1}{2}$ are actually performed via right shifts, so that the inverse transform is also multiplier-free. The small errors introduced by the right shifts are compensated by a larger dynamic range for the data at the input of the inverse transform.

After the inverse-transform, then the final results are normalized by a right shift of 6 bits (division by 64) with round off: $x_{ij}=(x'_{ij}+2^5)>>6$.

The transform and inverse transform matrices above have orthogonal basis functions. Unlike the DCT, though, the basis functions don't have the same norm. Therefore, for the inverse transform to recover the original pixels, appropriate normalization factors must be applied to the transform coefficients before quantization and after inverse quantization. Such factors are absorbed by the quantization and inverse quantization scaling factors described below.

By the above exact definition of the inverse transform, the same operations will be performed by both encoder and decoder. Thus we avoid the usual problem of "inverse transform mismatch".

There are two disadvantages of the foregoing inverse transform.

(1) Because there is a fractional coefficient $\frac{1}{2}$ in the transform matrices, the order of horizontal and vertical inverse transform will affect the results; i.e., doing the horizontal inverse transform first will lead different result from doing the vertical inverse transform first. It is impossible to convert the 2-D 4×4 inverse transform to an equivalent 1-D 16×16 inverse transform. For example, suppose the input 4×4 block is

| −3752 | −4608 | 1232 | −936 |
|---|---|---|---|
| −432 | 644 | −180 | 138 |
| −56 | 36 | −28 | 72 |
| −36 | 92 | −72 | 46 |

The result of doing the horizontal transform (the right matrix multiplication) followed by the vertical transform (the left matrix multiplication) is

| −117 | −118 | −119 | −120 |
|---|---|---|---|
| −101 | −99 | −97 | −100 |
| −63 | −61 | −53 | −50 |
| 15 | 36 | 49 | 60 |

Whereas, the result by doing the vertical transform followed by the horizontal transform is

| −117 | −118 | −119 | −121 |
|---|---|---|---|
| −101 | −99 | −97 | −100 |
| −63 | −61 | −53 | −50 |
| 15 | 36 | 49 | 60 |

The 03 output coefficients are different. This will lead to mismatch among different implementations.

(2) Because of the fractional coefficient "½", it is hard to do the direct matrix multiply implementation of the inverse transform, which is well suited for the 16-bit DSPs such as TMS320C54X, TMS320C55X, TMS320DSC2x, TMS320DM3X.

The preferred embodiment non-orthogonal inverse transformation of input normalized coefficients $\{y'_{00}, \ldots, y'_{33}\}$ to output pixels $\{x'_{00}, \ldots, x'_{33}\}$ is defined by:

$$X' = \begin{bmatrix} 2 & 2 & 2 & 1 \\ 2 & 1 & -2 & -2 \\ 2 & -1 & -2 & 2 \\ 2 & -2 & 2 & -1 \end{bmatrix} \begin{bmatrix} y'_{00} & y'_{01} & y'_{02} & y'_{03} \\ y'_{10} & y'_{11} & y'_{12} & y'_{13} \\ y'_{20} & y'_{21} & y'_{22} & y'_{23} \\ y'_{30} & y'_{31} & y'_{32} & y'_{33} \end{bmatrix} \begin{bmatrix} 2 & 2 & 2 & 2 \\ 2 & 1 & -1 & -2 \\ 2 & -2 & -2 & 2 \\ 1 & -2 & 2 & -1 \end{bmatrix}$$

After the preferred embodiment inverse-transform, the final results are normalized by a right shift of 8 bits (division by 256) with round off:

$$x_{ij} = (x'_{ij} + 2^7) >> 8.$$

The transform and inverse transform matrices above have orthogonal basis functions. Unlike the DCT, though, the basis functions don't have the same norm. Therefore, for the inverse transform to recover the original pixels, appropriate normalization factors must be applied to the transform coefficients before quantization and after inverse quantization. Such factors are absorbed by the quantization and inverse quantization scaling factors.

By the above exact definition of the inverse transform, the same operations will be performed by both the encoder and decoder. This avoids the usual problem of "inverse transform mismatch". That is, the preferred embodiment inverse transform guarantees the same output independent of the order of horizontal or vertical transform, and enables the implementation of direct matrix multiplication. Thus, it overcomes the disadvantages of the current H.26L inverse transform. Also, the preferred embodiment inverse transform has no quality loss and can be implemented with 16-bit arithmetic.

5. Modifications

The preferred embodiments can be varied in many ways while retaining one of more of the features of scaling after matrix multiplication to maintain limited precision and approximating a scaled matrix with an integer matrix.

For example, the 4×4 matrices and inputs and outputs could be other sizes, such as 8×8, 2×2, etc., and the integer elements could have precisions other than 16-bit, such as 8-bit. The forward 4×4 transform could use a scale factor $16*256/676^2$ in place of $32*512/676^2$ together with the matrix $$\begin{bmatrix} 7636 & 9986 & 7636 & 4111 \\ 7636 & 4111 & -7636 & -9986 \\ 7636 & -4111 & -7636 & 9986 \\ 7636 & -9986 & 7636 & -4111 \end{bmatrix}$$

Similarly, the scale factor could be 1/26 and the following matrices used with the first matrix used in the forward 4×4 transform and both matrices used in the inverse 4×4 transform along with shifts.

$$\begin{bmatrix} 16384 & 21425 & 16384 & 8822 \\ 16384 & 8822 & -16384 & -21425 \\ 16384 & -8822 & -16384 & 21425 \\ 16384 & -21425 & 16384 & -8822 \end{bmatrix} \text{and}$$

$$\begin{bmatrix} 1260 & 1260 & 1260 & 1260 \\ 1648 & 679 & -679 & -1648 \\ 1260 & -1260 & -1260 & 1260 \\ 679 & -1648 & 1648 & -679 \end{bmatrix}$$

What is claimed is:

1. A method of block transformation in image or video coding, comprising:
   (a) providing image or video signal encoded information as an input 4×4 block Y of integer coefficients; and
   (b) computing an output 4×4 block as $N Y N^T$ where N is a 4×4 matrix $$N = \begin{bmatrix} 2 & 2 & 2 & 1 \\ 2 & 1 & -2 & -2 \\ 2 & -1 & -2 & 2 \\ 2 & -2 & 2 & -1 \end{bmatrix}$$

(c) recovering the image or video signal using said computed output 4×4 block.

2. The method of claim 1, further comprising:
   (a) dividing the output 4×4 block by $2^8$.

3. The method of claim 1, wherein:
   (a) said input 4×4 block Y is of the form $M X M^T$ for a 4×4 block X of integers and M is the 4×4 matrix:

$$M = \begin{bmatrix} 1 & 1 & 1 & 1 \\ 2 & 1 & -1 & -2 \\ 1 & -1 & -1 & 1 \\ 1 & -2 & 2 & -1 \end{bmatrix}.$$

* * * * *